(12) United States Patent
Mayer

(10) Patent No.: US 6,727,462 B2
(45) Date of Patent: Apr. 27, 2004

(54) LASER MACHINING DEVICE

(75) Inventor: Hans Juergen Mayer, Viernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/345,164

(22) Filed: Jan. 16, 2003

(65) Prior Publication Data

US 2003/0141288 A1 Jul. 31, 2003

(30) Foreign Application Priority Data

Jan. 16, 2002 (DE) ......................... 102 01 476

(51) Int. Cl.[7] ............................... B23K 26/06
(52) U.S. Cl. ................................. 219/121.73
(58) Field of Search ............ 219/121.73, 121.74, 219/121.76, 121.77, 121.67, 121.68, 121.69, 121.78, 121.79; 385/31, 33; 356/317, 318

(56) References Cited

U.S. PATENT DOCUMENTS 4,993,837 A * 2/1991 Oshida et al. ............ 356/401
5,293,213 A * 3/1994 Klein et al. ............... 356/484
6,229,940 B1 * 5/2001 Rice et al. .................. 385/33

* cited by examiner

Primary Examiner—Kiley Stoner
Assistant Examiner—Jonathan Johnson
(74) Attorney, Agent, or Firm—Harness, Dickey & Pierce, P.L.C.

(57) ABSTRACT

A laser machining device can be used to direct two independent laser beams onto the same machining field in a single machining process. This can be achieved by using an at least partially reflective optical element, configured such that the first laser beam is essentially transmitted and the second laser beam is essentially reflected. The beam paths of the two laser beams are varied independently of each other by two deflection units before they strike the at least partially reflective optical element. This results in a large number of advantageous possibilities for the precise and continuous machining of materials.

34 Claims, 1 Drawing Sheet

LASER MACHINING DEVICE

The present application hereby claims priority under 35 U.S.C. §119 on German patent application number DE 10201476.0 filed Jan. 16, 2002, the entire contents of which are hereby incorporated herein by reference.

FIELD OF THE INVENTION

The invention generally relates to a device for machining objects using laser beams.

BACKGROUND OF THE INVENTION

Laser machining units today frequently use two or even more different laser beams, which are directed independently of each other onto the object to be machined. It is not always necessary to have a number of different laser light sources to generate the different laser beams. The laser beam emitted by a single laser suffices, for example, when a beam splitter is used to split it into a number of sub-beams, which can then be directed onto the object to be machined.

In many cases different laser light wavelengths are used, in particular to be able to process different materials with a high level of precision. Two or more laser light sources are generally used to generate two or more different laser light wavelengths. Alternatively a single laser can also be used, with the beam emitted by this laser being split into at least two sub-beams using beam splitters and with the wavelength of at least one of the two beams being changed by way of a non-linear optical effect (in particular what is known as frequency multiplication). In this way a single laser light source can be used to generate two different sub-beams just as when two laser light sources are used, with the spectral distribution of the one sub-beam being different compared with the spectral distribution of the other sub-beam.

Simultaneous use of a short-wave laser beam and a long-wave laser beam is required in particular for the laser structuring and laser drilling of multilayer circuit boards. Here, for example, the short-wave laser light, which also strikes the object to be machined in the shortest possible laser pulses, can be used to strip thin metal layers, which have formed both on the surface and inside the multilayer circuit boards and which separate different non-conducting layers. The longer-wave laser light is used to strip these non-conducting layers precisely. In this way, for example, holes can be created with a diameter of 20 µm or less, so that subsequent coating of a laser-drilled hole with metal will allow specific metal intermediate layers to be connected together in an electrically conductive fashion in an extremely small space.

Laser machining with two different wavelengths is currently carried out generally by using adjacent deflection units to direct two laser beams accurately onto the object to be machined. Each of the deflection units generally has two rotatable mirrors, so that the laser beam striking the object to be machined can be positioned in an x-y plane. The arrangement of the two deflection units has the disadvantage that the two laser beams, in so far as they are to be directed onto a common sub-area of the object to be machined, strike the machining surface at different angles. The different angles of impact of the two laser beams are particularly disadvantageous when laser-drilling small holes, as the different angles mean that the resulting diameter of the drilled hole becomes bigger as the hole gets deeper, particularly at the top edge of the hole. Also, when the angle differences are large, holes are drilled obliquely into the object to be machined. In the case of through holes, for example, this results in the hole on one side of the object having a different position than on the opposite side, so the precision of the drilled hole deteriorates significantly.

SUMMARY OF THE INVENTION

An object of an embodiment of the invention is therefore to create a device for machining objects using laser beams, which allows the essentially perpendicular machining of objects using two different laser beams.

An object my be achieved by a device for machining objects using laser beams. An embodiment of the invention is based on the knowledge that the best possible perpendicular machining of objects can be achieved using two different laser beams, if the beam paths of the two laser beams are at least approximately merged using a partially reflective optical element. The device according to an embodiment of the invention has the advantage that the two deflection units can in principle be located at any distance from each other, without this resulting in any deterioration of the beam control of the two laser beams directed onto the object due to significantly different angles of impact.

The device according to an embodiment of the invention can in particular be used advantageously for laser drilling, if the two laser beams are superimposed at the partially reflective optical element such that their beam paths strike the object to be machined in an essentially coaxial fashion. In this way, with precise control of the output of the two laser beams, both through holes and also what are known as blind holes can be drilled quickly and with a high level of precision.

The device according to an embodiment of the invention can however also be used advantageously for laser drilling, if the two laser beams are directed parallel with a specific displacement onto the hole to be machined. In this case two different holes can be drilled at the same time.

The most important advantage of the device according to an embodiment of the invention is that two separate laser beams can be directed completely independently of each other onto one and the same machining field to machine an object. This opens up a large number of possibilities for machining different types of objects precisely and quickly with a single machining unit.

The use of flat field lenses has an advantage that the two laser beams can be directed onto the object to be machined within a large machining area without the beam quality changing due to different focal widths. Such a change in focal widths generally occurs in standard spherical lenses, in which the focal area, i.e. the area in which the laser beam is focused for different angles of incidence of the laser beam, is on a spherical surface. Flat field lenses, which are also referred to as F-theta lenses, unlike standard spherical lenses, are characterized by the fact that the focal area is in a plane largely independent of the angle of incidence of the light beam striking the flat field lens. The use of flat field lenses therefore allows precise focusing of the machining laser beams within a large machining area, so that large objects can also be machined without interim displacement and therefore without interruption.

An embodiment of the invention in which the two deflection units are arranged perpendicular to each other, has an advantage that when the two deflection units are in the zero position the two laser beams strike the partially reflective optical element perpendicular to each other. This simplifies the structure and in particular the optical adjustment of a corresponding laser machining device, as when the two deflection units are in the zero position, the laser beams can exclusively be guided perpendicular or parallel to the machining surface.

In one embodiment, the two laser beams have different wavelengths and a dichroic mirror is used as the partially reflective element. The use of a dichroic mirror has the advantage compared with the use of conventional semi-permeable mirrors that, subject to appropriate spectral reflection and transmission characteristics on the part of the dichroic mirror, the output of the two different laser beams can be used to machine the object to be machined without major loss. Contrary to this, if a conventional semi-permeable mirror is used, both unwanted reflection of the transmitted laser beam and unwanted transmission of the reflected laser beam would occur. The intensities of these unwanted laser beams would result in a loss of output, which would have an adverse effect on the thermal stabilization of a laser machining unit, if the beams were merged using a conventional semi-permeable mirror. The use of a dichroic mirror tailored to the wavelengths of the two laser beams therefore facilitates thermal stabilization of the laser machining unit by reducing loss of output and as a result contributes to a consistently high level of machining accuracy over time.

In one embodiment, a first laser is used to create the first laser bean and a second laser to create the second laser beam.

As an alternative to using two laser light sources, the two laser beams can also be generated by a single laser, with the spectral distribution of at least one of the two laser beams being changed by what is known as frequency conversion. Frequency conversion, in which the frequency of the primary laser beam is increased, is for example illustrated by frequency multiplication within an optically non-linear crystal. Frequency conversion can however also be used to reduce the frequency of the primary laser light. This can be achieved, for example, by frequency mixing, in which two different light beams with different spectral distributions are spatially superimposed in an optically non-linear crystal, so that both the total frequency and in particular the differential frequency are generated between the frequencies of the two mixed light beams.

Efficient beam merging without loss of output due to unwanted reflected or unwanted transmitted laser beams can also be achieved with two laser beams of the same wavelength. For this, a polarization-dependent mirror may be used as the partially reflective optical element. Efficient use of a polarization-dependent reflector requires the polarization directions of the two laser beams to be different, ideally perpendicular to each other. For example, what is known as a Nichol prism or in principle any other optically active material with different refractive indices for different polarization directions can be used as a polarization-dependent mirror.

The polarization direction of light beams striking the polarization-dependent mirror may be influenced by an optically active crystal. For example, a light beam initially polarized linearly in a specific direction can be rotated through 90° using what is referred to as a λ/4 plate. However other materials, the optical activity of which is based on the magneto-optical effect (Faraday effect) or the electro-optical Kerr or Pockel's effect, can also be used as the elements to rotate polarization. It should also be pointed out that polarizing optical elements, such as, for example, a polarizer film or even a Nichol prism can be used to generate a polarized light beam from an initially unpolarized light beam.

BRIEF DESCRIPTION OF THE DRAWINGS

Further advantages and features of the present invention will emerge from the description which follows, as an example, of currently preferred embodiments.

The drawings show

DETAILED DESCRIPTION OF THE PREFERRED EMBODIMENTS

Figure 1:
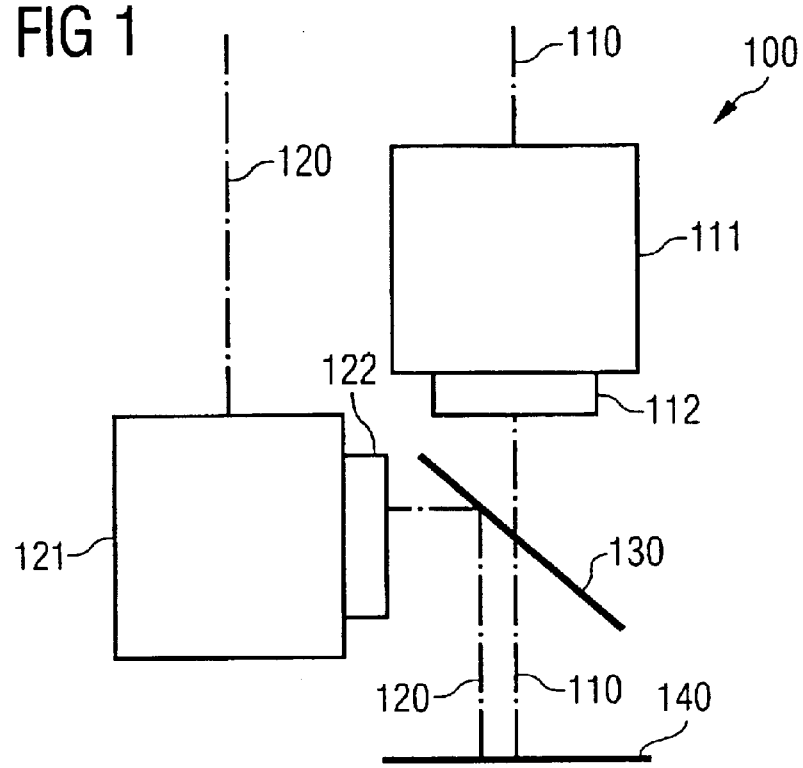
FIG. 1 a laser machining device according to a first embodiment of the invention and FIG. 2 a laser machining device according to a second embodiment of the invention.

FIG. 1 shows a diagrammatic representation of a laser machining device 100 according to a first embodiment of the invention. The laser machining device 100 allows an object (not shown) to be machined by two laser beams with different spectral distributions. As shown in FIG. 1, the beam path of a first laser beam 110 is changed by means of a deflection unit 111. The deflection unit 111 has at least two mirrors tilted towards each other, which can be moved by means of a control unit (not shown) such that the first laser beam 110 is deflected in a plane perpendicular to the diffusion of the first laser beam 110. The beam path of a second laser beam 120 is varied accordingly by means of a second deflection unit 121, which according to the embodiment of the invention shown here, is arranged perpendicular to the first deflection unit 111. Like the first deflection unit 111, the second deflection unit 121 has two mirrors tilted towards each other, which alter the beam path of the second laser beam 120 according to activation of the deflection unit 121 by a control unit (not shown).

Compared with the first deflection unit 111, the second deflection unit 121 also has a further reflector, so that with parallel orientation of the laser beams 110 and 120 primarily striking the two deflection units, the beam paths of the laser beams emerging from the two deflection units preferably meet each other at an angle of 90°. As an alternative to a further reflector, the zero position of at least one of the two mirrors in the second deflection unit 121 can also be adjusted appropriately in relation to the mirrors in the first deflection unit 111. In a further particularly preferred alternative due to the use of components of similar structure, a deflection unit identical to the first deflection unit 111 without an additional reflector can be used as the second deflection unit 121. In this case the laser beam 120 striking the deflection unit 121 should be oriented so that it is perpendicular to the first laser beam 110. This can be achieved simply with an additional reflector, which preferably deflects the laser beam 120 striking the deflection unit 121 through 90°.

There is also a flat field lens 112 or 122 in the beam path 110 or 120, located in the immediate vicinity of the deflection unit 111 or 121. The beams of the two laser beams 110 and 120 are merged by means of a dichroic mirror 130. The dichroic mirror 130 is characterized by a high transmission coefficient for the light of the first laser beam 110 and a high reflection coefficient for the light of the second laser beam 120. The first laser beam 110 transmitted through the dichroic mirror 130 and the second laser beam 120 reflected by the dichroic mirror 130 are focused on the machining plane 140 when the focal lengths of the two flat field lenses 112 and 122 are selected appropriately.

It should be noted that the spectral reflection and transmission characteristics of the dichroic mirror 130 should be carefully tailored to the wavelengths of the two laser beams 110 and 120. The beams can in particular be merged efficiently without major losses due to unwanted transmitted light from the second laser beam 120 and unwanted reflected light from the first laser beam 110 if the difference between the wavelengths of the two laser beams 110 and 120 is large enough for the dichroic mirror 130 to have a transmission coefficient as near as possible to 100% for the laser beam 110, and a reflection coefficient as near as possible to 100% for the laser beam 120. In conjunction with Nd:YAG, Nd:YVO$_4$, Nd:YLF, Excimer lasers and Co$_2$ lasers the wavelength combinations 355 nm and 532 nm, 355 nm and 1064 nm, 532 nm and 1064 nm, 355 nm and 9.2 μm to 10.6 μm as well as 532 nm and 9.2 μm to 10.6 μm are particularly suitable.

Conventional beam expanders (not shown in FIG. 1) can also be located in the beam paths of the two laser beams 110 and 120, so that the two laser beams 110 and 120 can be projected onto the machining plane 140 with a different focal width. These beam expanders can also be used for the fine adjustment of the two laser beams 110 and 120. The beam expander can also be adjusted to adjust the focal plane of the corresponding laser beam, so that laser machining can take place in different planes.

The focal plane can also be changed to free a previously drilled hole from unwanted traces of material. Such traces of material are, for example, burrs due to drilling or chips in the drilled hole. In a cleaning process of this nature the extent of focal displacement is selected so that the resulting beam intensity in the drilled hole is so strong that on the one hand unwanted traces of material are removed as completely as possible and on the other hand the amount of material stripped from the circuit board is so small that the geometry of the previously drilled hole is not changed.

It should also be noted that during transmission of the first laser beam 110 through the dichroic mirror 130, the beam is displaced to an extent which depends on the refractive index of the mirror substrate, its thickness and in particular the angle at which the first laser beam 110 strikes the dichroic mirror 130. Using the telecentric flat field lens 112 reduces the extent to which the beam displacement depends on the angle.

A high level of precision of the laser machining device 100 is ensured by regular calibration, which is carried out independently for the two laser beams 110 and 120. In each instance both the target position, at which the respective laser beam should strike an object, and the actual position, at which the respective laser beam strikes the object, are detected with an image detection device. The difference between the target position and the actual position is stored in what is known as a distortion table. This is then taken into account on subsequent activation of the respective deflection unit so that the previously detected differences between target position and actual position are compensated for as far as possible throughout the entire work area.

Figure 2:
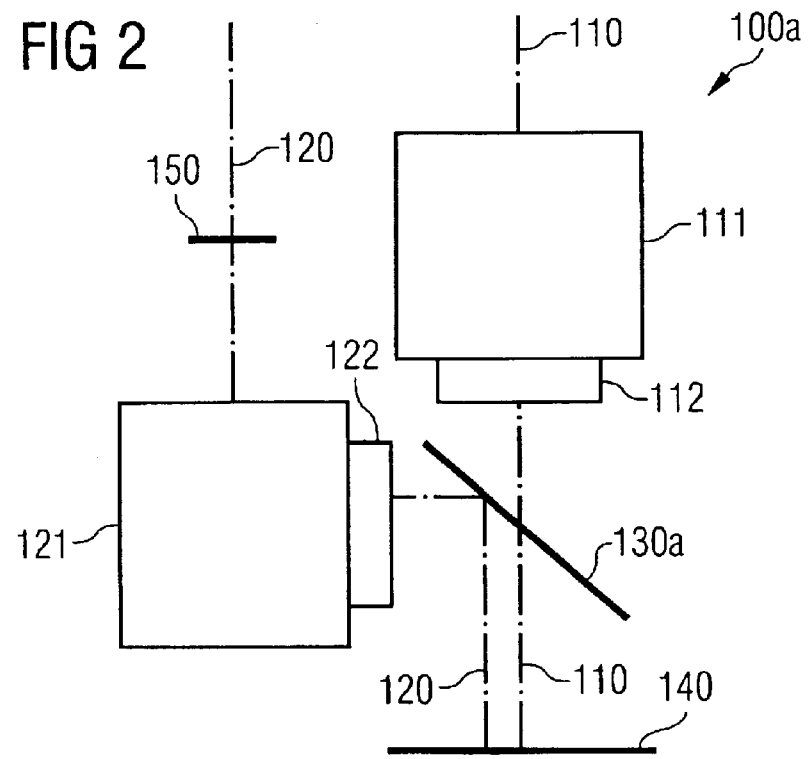

FIG. 2 shows a laser machining device 100a according to a second embodiment of the invention. The laser machining device 100a allows the beams from the first laser beam 110 and the second laser beam 120 to be merged, for which process the spectral distribution of the two laser beams 110 and 120 can be either different or the same. The laser machining device 100a is different from the laser machining device 100 in respect of the partially reflective optical element, which is a polarization-dependent mirror 130a in the case of the laser machining device 100a. Efficient beam merging without a high level of unwanted transmitted light intensity in respect of the second laser beam 120 and without a high level of unwanted reflected light intensity in respect of the laser beam 110 is best achieved if the polarization directions of the laser beams 110 and 120 striking the polarization-dependent mirror 130a are as different as possible.

This is ensured according to the embodiment of the invention shown in FIG. 2 by what is known as a polarization rotator 150, which changes the direction of polarization or the type of polarization of the second laser beam 120. Use of the polarization rotator 150 is particularly suitable when the two laser beams 110 and 120 are generated by the same laser by means of conventional beam splitting or when the two laser light sources are mounted such that the respective polarization directions of the two emitted laser beams 110 and 120 are the same.

It should be noted that different polarization of the two laser beams 110 and 120 can also be achieved without using a polarization rotator 150, by arranging the two laser light sources generating the two laser beams 110 and 120 in different spatial orientations.

The laser machining device 100a is calibrated in the same way as the laser machining device 100 described above using FIG. 1.

To summarize, the invention creates a laser machining device 100, which can be used to direct two independent laser beams 110, 120 onto the same machining field in a single machining process. This is achieved by using an at least partially reflective optical element 130, which is configured such that the first laser beam 110 is essentially transmitted and the second laser beam 120 is essentially reflected. The beam paths of the two laser beams 110 and 120 are varied independently of each other by two deflection units 111 and 121 before they strike the at least partially reflective optical element 130. The following advantageous possibilities in particular result for the machining of materials:

It is possible to work on the same machining field with two individually deflectable laser beams.

When using laser beams with the same wavelength, it is possible to achieve double the machining speed by machining two different adjacent structures at the same time.

When using pulsed laser beams it is possible to machine materials at double pulse frequency by superimposing the two laser beams coaxially by temporal displacement of the pulse sequences of the two laser beams. This is particularly advantageous when drilling holes.

It is possible to superimpose laser beams of different wavelengths coaxially and therefore carry out two machining stages almost simultaneously in one stage at the same point. This is particularly advantageous if different materials have to be stripped in the two machining stages and these are on top of each other in the object to be machined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for machining objects using laser beams, comprising:
    a first deflection unit, adapted to direct a first laser beam via a first projection lens onto a partially reflective element; and
    a second deflection unit, adapted to direct a second laser beam via a second projection lens onto the partially reflective element, wherein the partially reflective optical element is configured such that it essentially transmits the first laser beam and essentially reflects the second laser beam and wherein the partially reflective optical element is arranged in such a way in relation to an object to be machined, that the two laser beams are directed onto the object after at least one of transmission and reflection.

2. A device according to claim 1, wherein the first projection lens includes at least a first flat field lens.

3. A device according to claim 1, wherein the two deflection units are arranged perpendicular to each other.

4. A device according to claim 1, wherein a spectral distribution of the first laser beam includes a first wavelength, a spectral distribution of the second laser beam includes a second wavelength, different from the first wavelength, and the partially reflective element is a dichroic mirror.

5. A device according to claim 4, further comprising:
a first laser, adapted to generate the first laser beam, and
a second laser, adapted to generate the second laser beam.

6. A device according to claim 4, further comprising a laser, adapted to generate the first laser beam at least one of directly and indirectly by way of a frequency conversion and adapted to generate the second laser beam indirectly by way of a frequency conversion.

7. A device according to claim 1, wherein the partially reflective optical element is a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

8. A device according to claim 7, further comprising:
a polarization rotator, adapted to change the direction of polarization of the second laser beam striking the polarization-dependent mirror.

9. A device according to claim 1, wherein the second projection lens includes at least a second flat field lens.

10. A device according to claim 1, wherein the first projection lens includes at least a first flat field lens and the second projection lens includes at least a second flat field lens.

11. A device according to claim 2, wherein the two deflection units are arranged perpendicular to each other.

12. A device according to claim 9, wherein the two deflection units are arranged perpendicular to each other.

13. A device according to claim 10, wherein the two deflection units are arranged perpendicular to each other.

14. A device according to claim 2, wherein a spectral distribution of the first laser beam includes a first wavelength, a spectral distribution of the second laser beam includes a second wavelength, different from the first wavelength, and the partially reflective element is a dichroic mirror.

15. A device according to claim 9, wherein a spectral distribution of the first laser beam includes a first wavelength, a spectral distribution of the second laser beam includes a second wavelength, different from the first wavelength, and the partially reflective element is a dichroic mirror.

16. A device according to claim 10, wherein a spectral distribution of the first laser beam includes a first wavelength, a spectral distribution of the second laser beam includes a second wavelength, different from the first wavelength, and the partially reflective element is a dichroic mirror.

17. A device according to claim 2, wherein the partially reflective optical element is a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

18. A device according to claim 9, wherein the partially reflective optical element is a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

19. A device according to claim 10, wherein the partially reflective optical element is a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

20. A device according to claim 4, wherein the partially reflective optical element is a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

21. A device according to claim 17, further comprising:
a polarization rotator, adapted to change the direction of polarization of the second laser beam striking the polarization-dependent mirror.

22. A device according to claim 18, further comprising:
a polarization rotator, adapted to change the direction of polarization of the second laser beam striking the polarization-dependent mirror.

23. A device according to claim 19, further comprising:
a polarization rotator, adapted to change the direction of polarization of the second laser beam striking the polarization-dependent mirror.

24. A device according to claim 20, further comprising:
a polarization rotator, adapted to change the direction of polarization of the second laser beam striking the polarization-dependent mirror.

25. A device for machining objects using laser beams, comprising:
first deflection means for directing a first laser beam via a first projection lens onto a partially reflective element; and
second deflection means for directing a second laser beam via a second projection lens onto the partially reflective element, wherein the partially reflective optical element is configured such that it essentially transmits the first laser beam and essentially reflects the second laser beam and wherein the partially reflective optical element is arranged in such a way in relation to an object to be machined, that the two laser beams are directed onto the object after at least one of transmission and reflection.

26. A device according to claim 25, wherein the first projection lens includes at least a first flat field lens.

27. A device according to claim 25, wherein the two deflection means are arranged perpendicular to each other.

28. A device according to claim 25, wherein a spectral distribution of the first laser beam includes a first wavelength, a spectral distribution of the second laser beam includes a second wavelength, different from the first wavelength, and the partially reflective element includes a dichroic mirror.

29. A device according to claim 25, further comprising:
first laser means for generating the first laser beam, and
second laser means for generating the second laser beam.

30. A device according to claim 25, further comprising laser means for generating the first laser beam at least one of directly and indirectly by way of a frequency conversion and for generating the second laser beam indirectly by way of a frequency conversion.

31. A device according to claim 25, wherein the second projection lens includes at least a second flat field lens.

32. A device according to claim 25, wherein the first projection lens includes at least a first flat field lens and the second projection lens includes at least a second flat field lens.

33. A device according to claim 25, wherein the partially reflective optical element includes a polarization-dependent mirror, the reflective capacity of which depends on the polarization of the light striking the polarization-dependent mirror, and the direction of polarization of the first laser beam striking the polarization-dependent mirror is essentially perpendicular to the direction of polarization of the second laser beam striking the polarization-dependent mirror.

34. A device according to claim 33, further comprising:
polarization rotator means for changing the direction of polarization of the second laser beam striking the polarization-dependent mirror.

* * * * *